(12) United States Patent
Monaghan et al.

(10) Patent No.: US 6,549,309 B1
(45) Date of Patent: *Apr. 15, 2003

(54) HOLOGRAPHY APPARATUS, METHOD AND PRODUCT

(75) Inventors: Brian J. Monaghan, North Wales, PA (US); Anthony W. Heath, Lansdale, PA (US)

(73) Assignee: Illinois Tool Works Inc., Glenview, IL (US)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/021,281

(22) Filed: Feb. 10, 1998

(51) Int. Cl.[7] ................................................ G03H 1/02
(52) U.S. Cl. ................................ 359/27; 359/1; 359/2; 359/35
(58) Field of Search ........................ 359/2, 27, 35, 359/1

(56) References Cited

U.S. PATENT DOCUMENTS

| | | | |
|---|---|---|---|
| 3,551,018 A | 12/1970 | Stetson | 350/3.5 |
| 3,832,948 A | 9/1974 | Barker | 101/401.1 |
| 3,970,781 A | 7/1976 | Dalton et al. | 178/7.6 |
| 4,046,986 A | 9/1977 | Barker | 219/121 |
| 4,806,731 A | 2/1989 | Bragard et al. | 219/121.69 |
| 4,879,451 A | 11/1989 | Gart | 219/121.69 |
| 4,940,881 A | 7/1990 | Sheets | 219/121.69 |
| 4,959,275 A | 9/1990 | Iguchi et al. | 428/603 |
| 5,083,850 A | * 1/1992 | Mallik et al. | 359/1 |
| 5,149,937 A | 9/1992 | Babel et al. | 219/121.68 |
| 5,198,636 A | 3/1993 | Suchan | 219/121.68 |
| 5,243,589 A | * 9/1993 | Stuke et al. | 369/100 |
| 5,262,275 A | 11/1993 | Fan | 430/273 |
| 5,291,317 A | * 3/1994 | Newswanger | 359/15 |
| 5,605,097 A | 2/1997 | Ruckl et al. | 101/128.4 |
| 5,633,105 A | * 5/1997 | Jensen et al. | 430/18 |
| 5,698,351 A | 12/1997 | Fischer | 430/6 |
| 5,706,106 A | 1/1998 | Monaghan | 359/1 |
| 5,817,243 A | * 10/1998 | Shaffer | 216/65 |
| 5,822,092 A | 10/1998 | Davis | 359/10 |
| 5,910,256 A | * 6/1999 | Tsunetomo et al. | 216/24 |
| 5,948,289 A | * 9/1999 | Noda et al. | 219/121.69 |

FOREIGN PATENT DOCUMENTS

| | | | | |
|---|---|---|---|---|
| DE | 3514-642 A | * 10/1986 | | 359/27 |
| EP | 0393709 | 4/1990 | | |
| EP | 0 393 709 A3 | 10/1990 | | |
| EP | 0 393 709 A2 | 10/1990 | | |
| EP | 0467601 | 7/1991 | | |
| EP | 0 467 601 A2 | 1/1992 | | |
| EP | 0 467 601 A3 | 1/1992 | | |
| GB | 2133574 | 9/1983 | | |
| GB | 2151066 | 12/1983 | | |
| GB | 2 133 574 A | 7/1984 | | |
| GB | 2 151 066 A | 7/1985 | | |
| GB | 2215078 | 2/1988 | | |
| GB | 2222696 | 7/1988 | | |
| GB | 2 515 078 A | 9/1989 | | |
| GB | 2 222 696 A | 3/1990 | | |
| GB | 2271648 | 10/1992 | | |
| GB | 2 271 648 A | 4/1994 | | |

OTHER PUBLICATIONS

Edited by Alan Rhody and Franz Ross, *Holography Marketplace*, Seventh Edition, 1998, pp. 34–39.

J. Bordogna & S. A. Keneman, "Holographic Recording Materials", Springer–Verlag Berlin Heidelberg, New York 1977, pp. 229–241.

* cited by examiner

*Primary Examiner*—Cassandra Spyrou
*Assistant Examiner*—Craig Curtis
(74) *Attorney, Agent, or Firm*—Lisa M. Soltis; Mark W. Croll; Donald J. Breh

(57) ABSTRACT

Holographic patterns are produced by utilizing a laser to illuminate a workpiece with an interference pattern, with sufficient laser power to ablate the workpiece where it is illuminated by the laser, and moving the workpiece and the interference pattern relative to each other.

50 Claims, 2 Drawing Sheets

HOLOGRAPHY APPARATUS, METHOD AND PRODUCT

FIELD OF THE INVENTION

The present invention relates to a technique for producing holographic patterns and more particularly to the apparatus and method for practicing this technique and the products which result.

DESCRIPTION OF THE PRIOR ART

It is known to use interferometry to expose light sensitive material (photoresist) so as to harden that material in specific locations. When the unhardened portions are removed, the remaining material forms patterns of lands and grooves which correspond to interference patterns and which can therefore be used to produce holographic products. To that end, the patterns initially formed in the photoresist are processed so that they can then be embossed in metal or plastic. The resulting embossings are used as shims for transferring these patterns onto the final holographic product, such as sheets of paper, plastic film, or the like.

In performing the initial exposure, the interferometric illumination had to remain stationary at each desired location for a sufficient period to harden the photoresist at that location. The illumination would then be moved to the next location and the exposure repeated there. This movement was accomplished by appropriately displacing the interferometer "head", or the substrate bearing the photoresist. The required dwell time at any particular exposure location was of the order of magnitude of 1 millisecond.

Unfortunately, a dwell time of that duration was frequently incompatible with unintentional displacements of the interferometer head and/or the photoresist-bearing substrate. Such unintentional displacements can be caused by environmental factors, such as vibrations induced by the nearby passage of vehicles, or by other vibration-producing equipment. They can also be caused by the functioning of the exposure-producing equipment itself. Specifically, since the displacement between consecutive photoresist exposure locations took place intermittently, between exposure at one location and the next, the starting and stopping of this intermittent displacement, in itself, gave rise to vibrations in the equipment. As a result, the stationary dwelling of the illumination at each location was compromised and the resulting, interference pattern was degraded. In turn, this also caused degradation of the holographic effects in the end product.

In practice, even vibrations of small amplitude could lead to serious degradation, because of the high degree of positional precision required to achieve correct interferometric exposures.

Efforts to overcome this problem by using more massive photoresist supports, or more firmly mounted interferometer heads not only led to unwanted complexity, but were sometimes counterproductive. Thus, the more massive the supports, the more difficult it became to displace them without inducing increased start-stop vibrations.

The same problems also tended to limit the size of the surface on which the initial exposures could be performed. In turn, this meant that large holographic surfaces had to be built up from multiple small surfaces placed side-by-side. That caused the appearance, in the final holographic product, of seams which are considered visually objectionable.

Accordingly, it is an object of the present invention to overcome one or more of the problems described above.

It is another object to provide a technique for producing holographic products which is less subject than the prior art to vibration problems.

It is still another object to produce holographic products which are free of seams over substantially larger areas than heretofore.

These and other objects which will appear are achieved as follows.

SUMMARY OF THE INVENTION

In accordance with the present invention, a pulsed laser beam is projected interferometrically onto a workpiece, so as to consecutively form interference patterns on selected spots of that workpiece. The beam intensity and the workpiece material are so chosen that this material is ablated in lines which correspond to the illuminated lines of the laser interference pattern. The workpiece and laser beam are displaced relative to each other, so that the consecutive spots are formed at different locations on the workpiece. In this way, there is formed on the workpiece a set of ablation patterns which collectively correspond to a desired overall holographic pattern, or holographic imagery. We have found that the pulsed laser projection on each individual spot can be of extremely short duration, so short that any displacement of that spot on the workpiece due to vibration of either that workpiece or the laser, or both, will be too small to appreciably degrade the interference pattern created at that spot. Indeed, we have discovered that it is even possible to intentionally keep the workpiece and the laser in continuous movement relative to each other, and still create no appreciable degradation of the resulting interference patterns and therefore also no degradation of the ultimate holographic product.

Accordingly, our technique has numerous advantages over the prior art.

In our technique, the laser pulses can have a duration of the order of 6 to 10 nanoseconds, which is some 100,000 times shorter than the 1 milliseconds exposure previously used for photoresists. Obviously, no appreciable displacement of workpiece relative to laser beam can take place during such a period of only a few nanoseconds. Consequently, our technique does not suffer from degradation due to vibration effects and cat be applied to large surfaces. Our technique does not necessarily require intermittent, start-stop movements of the workpiece relative to the laser beam, but can be carried out with continuous relative movement. Our technique operates; more rapidly, since the much longer exposure times required for photoresists are essentially eliminated, and our technique also does not require the chemicals and "wet chemistry" involved in using photoresists.

For further details, reference is made to the discussion which follows, taken in light of the accompanying drawings wherein

BRIEF DESCRIPTION OF THE DRAWINGS

The same reference numerals are used in the several figures to denote corresponding elements.

DETAILED DESCRIPTION OF THE DRAWINGS

Figure 1:
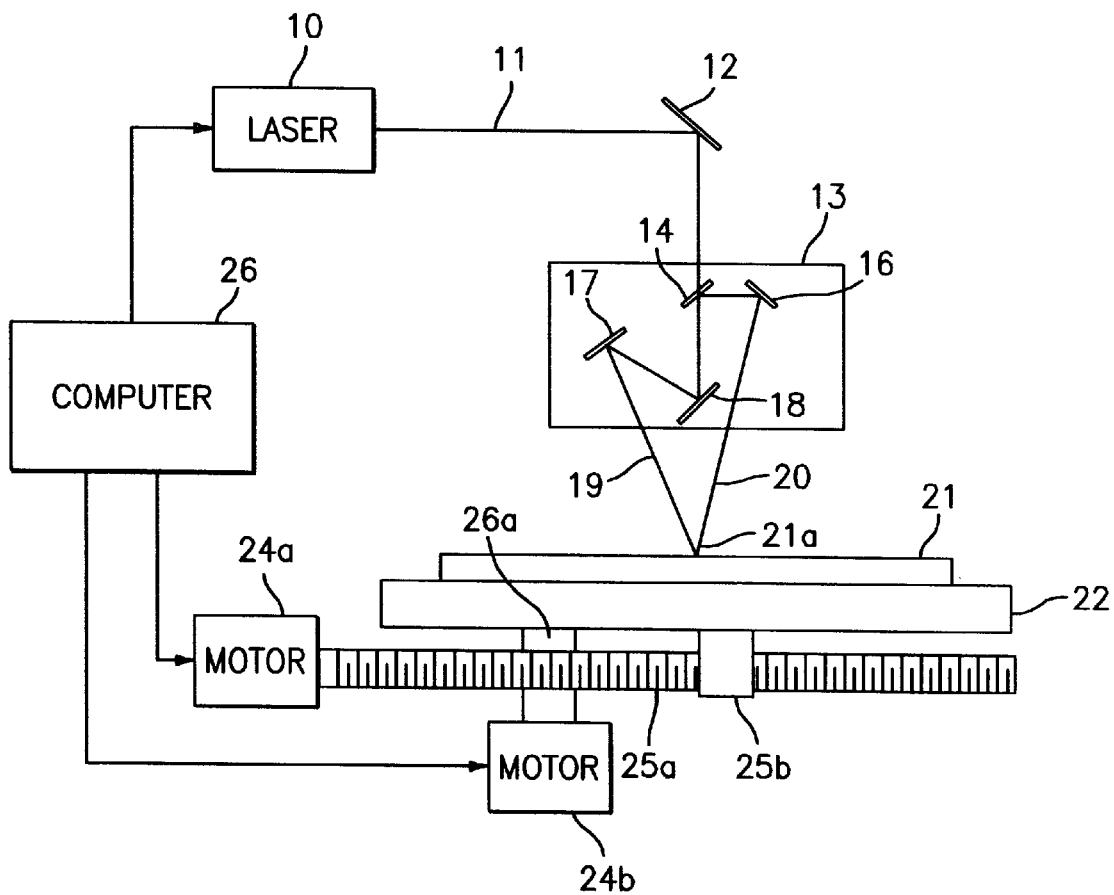
FIG. 1 is a simplified diagrammatic illustration of an embodiment of the present invention.

Referring to FIG. 1, this shows a laser 10 which is adapted to emit a pulsed laser beam 11. A mirror 12 deflects beam 11 toward an interferometer head 13. Head 13 includes a beam-splitting mirror 14 and a set of three additional mirrors 16, 17 20 and 18 for directing the split beams 19 and 20 toward a workpiece 21, in such relative angular orientations as to create the desired interference pattern at a spot 21a on that workpiece 21.

Workpiece 21 is mounted on a moveable table 22. Reversible stepper motors 24a and 24b are provided for displacing table 22 step-wise in two mutually perpendicular directions, both parallel to the surface of workpiece 21. Motor 24a drives table 22 selectively to the right or to the left in FIG. 1. Motor 24b drives table 22 selectively into or out of the plane of the paper in FIG. 1. These movements are transmitted from the respective stepper motor to the table 22 by mutually perpendicular lead screws to which table 22 is driveably connected. In FIG. 1, there are visible the right-left lead screw 25a and internally threaded sleeve 25b which connects lead screw 25a to table 22. The in-and-out lead screw is not visible in FIG. 1 because it is hidden behind motor 24b; only its connection 26a to table 22 is visible in that figure.

A computer 26 controls the stepping operations of motors 24a and 24b and the pulsing of laser 10 in the following manner.

The table 22, and with it workpiece 21, are displaced in small incremental steps. At the end of each predetermined number of steps, during the stop which forms part of the last of these steps, the laser 10 is pulsed so that a spot 21a on workpiece 21 is interferometrically illuminated, and a land-and-groove pattern is formed through ablations which correspond to the interference pattern produced at that spot.

Typically, motor 24a, through lead screw 25a, will cause table 22 (and workpiece 21) to move the full length of that workpiece, e.g. from left to right in FIG. 1, while laser 10 is pulsed as described above. Motor 24b, through its in-and-out lead screw (not visible in FIG. 1), will then move the table and workpiece by the width of one spot at right angles to the preceding movement, e.g. into the plane of the paper in FIG. 1. Motor 24a then moves the table and workpiece back in the opposite direction from before, i.e. from right to left, and so on repeatedly until as much of workpiece 21 as desired is covered by the spots of ablation produced patterns.

After this process has been carried to completion, workpiece 21 is used as the "master" for embossing corresponding patterns, either directly into the final holographic product, or into intermediate "shims" which are then used in turn to emboss these patterns into the final product.

Laser 10 is preferably a so-called YAG (yttrium aluminum garnet) laser. We have found that, surprisingly, very brief illumination with such a laser is sufficient to produce the desired ablation of the workpiece 21. That workpiece may be made of any material capable of being so ablated. Specific materials which have been found suitable are plastics, such as polyimides and aminimides. For example, sheets of Kapton, which is a polyimide material commercially available from the Dupont Company, Wilmington, Del., have been found suitable as workpiece 21.

Due to the freedom from vibration problems, such holographically patterned sheets can be produced with dimensions up to 32×42 inches, which is a standard size for current conventional equipment used for subsequent processing. However, even larger sheets are expected to be producible by the present invention. In the prior art, products of such size could be made only by piecing together several smaller sheets, with the attendant objectionable seam lines.

The technique of the present invention is not limited to use with flat workpieces such as shown in FIG. 1. Rather, it can be applied to other workpiece configurations, such as the cylindrical form shown in FIG. 2, to which reference may now be had.

Figure 2:
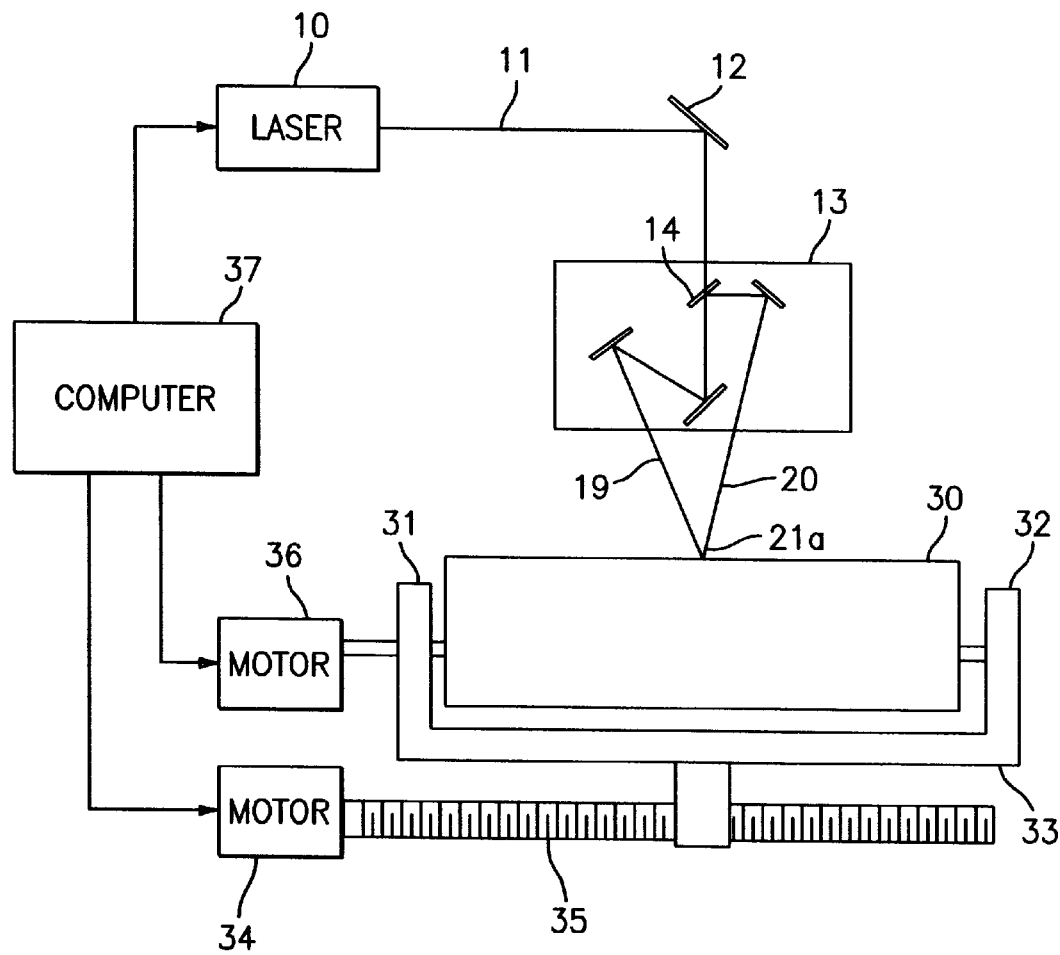
FIG. 2 is a similarly simplified diagrammatic illustration of another embodiment of the invention.

In FIG. 2, a cylindrical workpiece 30 is provided in the form of a sheet, or a surface coating on a cylindrical substrate. Cylinder 30 is mounted in bearings 31, 32 for rotation about its axis and also, by means of cradle 33, for translation parallel to its axis. As in FIG. 1, a laser 10 produces a beam 11, which is projected interferometrically on workpiece 30. A stepper motor 34 and associated lead screw 35 are provided to translate cradle 33 axially with respect to cylinder 30. Another stepper motor 36 is connected to the cylinder to provide rotation about its axis. A computer 37 coordinates the movements of the cylinder and the pulsing of laser 10.

A variety of patterns of cylinder movements and laser pulses can be used. For example, the cradle 33 can be moved alternately from left to right and from right to left, while the cylinder 30 is rotated by one width of spot 21a at the end of each such movement. In this way, an overall pattern is built up on workpiece 30 which consists of axial rows of spots 21a displaced circumferentially around the cylinder.

Alternatively, the cylinder 30 can be moved axially from one end to the other, while also rotating it during that axial movement. By performing these movements at the appropriate relative rates, there is formed a pattern of spiral lines of spots 21a around the workpiece 30.

The stepper motors previously mentioned in relation to FIGS. 1 and 2 operate at very high rates of stepping frequency. For example, they may produce 375,000 step movements per inch of overall displacement. The laser associated with these embodiments may then be pulsed so as to produce an illuminated spot 21a every 1,875 steps, i.e. 200 times per inch. The step movement occurs in so many small increments per unit length of movement that it is virtually continuous. The reason for preferring steps to true continuous movement is that the former lends itself to convenient digital control of the relationship between movement and laser pulsing. Alternatively true continuous movement may be used.

Whether intermittent or continuous, a workpiece movement speed of about 2" per second has been found suitable, using a YAG laser's third harmonic as the beam source. As for spot size, 125 microns has been found suitable. Other values can, of course, be used as appropriate.

The remaining processing of the workpieces treated in accordance with the invention may be done in known manner, for example, as disclosed in U.S. Pat. No. 5,706,106; issued Jan. 6, 1998.

It will be understood that the inventive technique is not limited to producing the specific over-all patterns described. Rather, by appropriate programming of the computers 26 and 37 any of a variety of spot patterns can be produced.

Also, the individual spots 21a need not all have the same interference patterns and consequent holographic effects. It is known that holographic patterns create different visual effects depending upon the azimuthal orientation of the land-and-groove patterns which produce the holographic effect. Accordingly, means can be provided for changing the azimuthal orientation of the interferometer head 13 shown in FIGS. 1 and 2 from time to time. This will correspondingly change the orientation of the interference patterns on the workpiece. In this way, visually distinctive regions, or "imagery" can be incorporated in the overall holographic pattern. These changes can be programmed into the respective computer so as to take place automatically during the exposure process.

The appearance of the holographic patterns produced in accordance with the present invention can also be changed by changing the included angle between the two split beams 19 and 20 (FIGS. 1 and 2) as these approach and impinge upon the workpiece. Such changes change the spatial frequency of the interference pattern created by the beams on the workpiece. Such changes in included angle can be accomplished by piezoelectric control of the angular positions of the mirrors which direct these split beams 19 and 20 onto the workpiece.

We have also found that changes in the power level of the laser beam can effect changes in the size of spot 21*a*, and this also produces changes in the holographic effect.

It is also known that a holographic pattern produced by two split beams, as in the case of FIGS. 1 and 2, will produce a visual holographic effect primarily in one viewing plane. This effect diminishes as the viewing direction deviates in azimuth, reaching a minimum at right angles to the maximum. Yet, it is frequently desirable to provide holographic effects which are more uniform in azimuth. This can readily be accomplished by the inventive technique.

Figure 3:
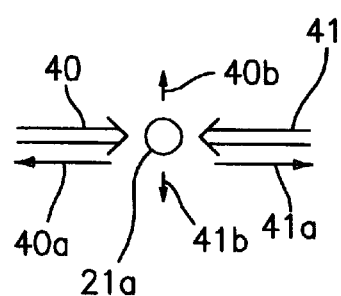
FIGS. 3 and 4 are diagrams which will assist in explaining certain features of the invention.

FIG. 3 shows the azimuth orientations 40 and 41 from which the split beams 19 and 20 of FIGS. 1 and 2 are projected onto their respective workpieces and spots 21*a*. These orientations yield a spot 21*a* which creates a maximum holographic effect in the directions 40*a* and 41*a*. The effect is at a minimum in the intermediate directions 40*b* and 41*b*.

Figure 4:
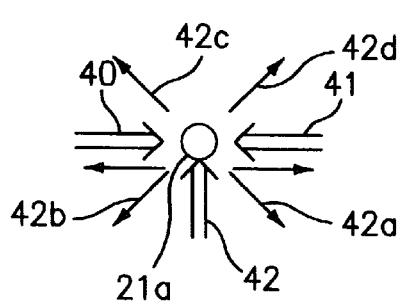

FIG. 4 shows how the effect can be made azimuthally more uniform. To that end, there is generated a third split beam at orientation 42, which is projected on spot 21*a* at an azimuthal orientation midway between orientations 40 and 41. This additional beam interacts with the beams in orientations 40 and 41 to produce four additional maximal viewing directions 42*a, b, c* and *d*. In this way, the azimuthal variations between maximum to minimum holographic effects are substantially reduced.

To obtain such a third split beam 42, the two split beams (19 and 20 in FIGS. 1 and 2) obtained by the single beam-splitting mirror 14 would each have to be split a second time, at right angles to the first split, with only 3 of the resulting 4 split beams projected onto the workpiece.

Of course, other azimuthal relationships between split beam orientations can also be used, e.g. 3 beams azimuthally oriented at 120° from each other.

It will be understood that other modifications will occur to those skilled in the art without departing from the inventive concepts. For example, interferometer head 13 can be moved in lieu of the workpiece to produce the patterns of spots 21*a*, or even both the head and the workpiece. However, such movement of head 13 would be a more delicate operation and is therefore not preferred. Accordingly, it is desired to limit the inventive concept only by the appended claims.

What is claimed is:

1. A method of producing a holographic pattern, comprising the steps of:

utilizing a laser beam to illuminate a workpiece with an interference pattern, said laser beam having separate portions, at least one of said separate laser beam portions deflected by controlling the angular position of a mirror so as to converge with the remaining separate portions at said workpiece with an adjustable included angle therebetween and having sufficient power to ablate said workpiece where illuminated by said laser beam portions, and producing relative movement between said laser beam and said interference pattern.

2. The method of claim 1 wherein said laser illumination and resulting ablation are produced intermittently.

3. The method of claim 1 wherein said laser is a YAG laser.

4. The method of claim 1 wherein said workpiece is a layer of polyimides, or aminimides on a supporting substrate.

5. A holographic pattern produced in said workpiece by the method of claim 1.

6. The method of claim 1 wherein said ablation produces an interference pattern of lands and grooves in said illuminated workpiece.

7. The method of claim 2 wherein said relative movement and said laser illumination is coordinated so that different areas of said workpiece are illuminated by consecutive intermittent illuminations by said laser.

8. The method of claim 2 wherein each occurrence of said intermittent laser illumination is produced during a period of time sufficiently brief so that no substantial relative movement between said laser beam and said interference pattern can have taken place.

9. A holographic pattern produced in said workpiece by the method of claim 2.

10. The method of claim 7 wherein said workpiece is substantially flat and the relative movement thereof takes place along mutually perpendicular directions that lie in a plane parallel to the surface of the workpiece.

11. The method of claim 7 wherein said workpiece is substantially cylindrical and the relative movement thereof takes place parallel to the cylinder axis and circumferentially around the axis.

12. The method of claim 7 wherein said relative movement is computer controlled to cause said illuminations and resulting ablations to collectively produce an overall holographic pattern in said workpiece.

13. The method of claim 7 wherein said relative movement is produced substantially continuously.

14. The method of claim 7 wherein at least some portions of said workpiece are illuminated by laser interference patterns in a plurality of different azimuthal orientations.

15. The method of claim 8 wherein said period is less than about 10 nanoseconds.

16. The method of claim 8 which further comprises transferring said holographic pattern from said workpiece to a web.

17. The method of claim 16 wherein said web is formed by a roll of paper or plastic.

18. The method of claim 16 wherein said web is in sheet form.

19. The method of claim 12 wherein said pattern forms a predetermined holographic imagery.

20. The method of claim 14 wherein said laser illuminations in different orientations are produced consecutively.

21. The method of claim 14 wherein said laser illuminations in different orientations are produced simultaneously.

22. Apparatus for producing a holographic pattern, said apparatus comprising:

a laser generating a laser beam;

means for dividing the laser beam into separate laser beam portions;

means for utilizing said laser beam portions to illuminate a workpiece with an interference pattern by controlling the angular position of a mirror, thereby deflecting at least one of said separate laser beam portions so as to converge with the remaining laser beam portions at said workpiece with an adjustable included angle therebetween, said illumination being sufficiently powerful to ablate said workpiece where illuminated by said interference pattern; and means for producing relative movement between said laser beam portions and said interference pattern.

23. The apparatus of claim 22 further comprising means for changing the azimuthal orientation of the interference pattern on the workpiece.

24. The apparatus of claim 22 further comprising means for changing the included angle between said split beams directed toward said workpiece.

25. The apparatus of claim 22 wherein the means for producing said relative movement includes at least one computer-controlled stepper motor for displacing said workpiece relative to said laser illumination.

26. The apparatus of claim 25 which comprises two computer-controlled stepper motors for displacing said workpiece in mutually orthogonal directions.

27. A method of producing a holographic pattern, the method comprising:

illuminating a workpiece with a laser beam having separate portions interfering at a prescribed location on the workpiece, forming thereby an interference pattern on the workpiece and sufficient power to ablate the workpiece;

adjusting the included angle between the separate portions of the laser beam by controlling the angular position of a mirror, thereby deflecting at least one of the separate portions of the laser beam; and producing relative movement between said laser beam and said interference pattern.

28. The method as set forth in claim 27 wherein illuminating the workpiece with a laser beam comprises ablating the workpiece where illuminated.

29. The method as set forth in claim 27 wherein illuminating the workpiece with a laser beam comprises illuminating the workpiece intermittently.

30. The method as set forth in claim 27 wherein illuminating the workpiece with a laser beam comprises illuminating the workpiece with a laser beam generated from a YAG laser.

31. The method as set forth in claim 27 wherein the workpiece is substantially flat.

32. The method as set forth in claim 27 wherein the workpiece is substantially cylindrical.

33. A holographic pattern produced in the work piece by the method of claim 27.

34. The of claim 27 wherein adjusting the included angle between the separate portions of the laser beam includes piezoelectrically deflecting at least one of the separate portions of the laser beam.

35. The method as set forth in claim 29 wherein intermittently illuminating the workpiece with a laser beam comprises illuminating the workpiece for a prescribed period sufficiently short in duration wherein the relative movement between the workpiece and the separate portions of the laser beam is substantially zero.

36. The method as set forth in claim 29 wherein intermittently illuminating the workpiece for a prescribed period comprises illuminating the workpiece for a period of approximately six to ten nanoseconds.

37. The method as set forth in claim 29 wherein moving the workpiece relative to the separate portions of the laser beam and illuminating the workpiece intermittently comprises illuminating consecutive prescribed locations of the workpiece.

38. A holographic pattern produced in the workpiece by the method of claim 29.

39. The method as set forth in claim 31 wherein the relative movement between the workpiece and the separate laser beams is in a rectilinear coordinate system.

40. The method as set forth in claim 31 wherein the relative movement between the workpiece and the separate laser beams is in a cylindrical coordinate system.

41. The method as set forth in claim 37 wherein illuminating consecutive prescribed locations of the workpiece is computer controlled forming thereby a predetermined holographic pattern.

42. The method as set forth in claim 35 further comprising transferring the holographic pattern from the workpiece to a web.

43. The method as set forth in claim 42 wherein the web is formed from a roll of paper or plastic.

44. The method as set forth in claim 42 wherein the web is a sheet.

45. An apparatus for producing a holographic pattern in a workpiece, the apparatus comprising:

a laser generating a laser beam having sufficient power to ablate the workpiece;

an interferometer dividing the laser beam into separate portions wherein the separate portions interfere at a prescribed location on the workpiece, forming thereby an interference pattern on the workpiece; the interferometer including a deflector for deflecting at least one of the separate laser beam portions;

a control system controlling the angular position of the deflector thereby changing the included angle between the separate portions of the laser beam and directing the relative movement between the workpiece and the separate portions of the laser beam in coordination with the generation of the laser beam.

46. The apparatus as set forth in claim 45 wherein the laser comprises a YAG laser.

47. The apparatus as set forth in claim 45 wherein the interferometer comprises:

a beam splitter receptive of the laser beam generated by the laser for dividing the laser beam into separate portions thereof;

a beam reflector receptive of one of the separate portions of the laser beam;

wherein the separate portions of the laser beam interfere at the workpiece.

48. The apparatus as set forth in claim 45 wherein the control system comprises:

a holder for holding the workpiece;

a motor coupled to the holder; and a controller in signal communication with the motor and with the laser for coordinating the relative movement of the workpiece and the separate portions of the laser beam and the generation of the laser beam.

49. The apparatus as set forth in claim 48 wherein the holder is a table moveable in a rectilinear coordinate system.

50. The apparatus as set forth in claim 48 wherein the holder is a cradle moveable in a cylindrical coordinate system.

* * * * *